United States Patent
Williams et al.

(10) Patent No.: US 6,184,937 B1
(45) Date of Patent: Feb. 6, 2001

(54) AUDIO ENHANCED ELECTRONIC INSERTION OF INDICIA INTO VIDEO

(75) Inventors: Brown F. Williams; Roy J. Rosser, both of Princeton, NJ (US)

(73) Assignee: Princeton Video Image, Inc., Lawrenceville, NJ (US)

(*) Notice: Under 35 U.S.C. 154(b), the term of this patent shall be extended for 0 days.

(21) Appl. No.: 09/171,941

(22) PCT Filed: Mar. 14, 1997

(86) PCT No.: PCT/US97/04083

§ 371 Date: Oct. 29, 1998

§ 102(e) Date: Oct. 29, 1998

(87) PCT Pub. No.: WO97/41683

PCT Pub. Date: Nov. 6, 1997

Related U.S. Application Data

(60) Provisional application No. 60/016,419, filed on Apr. 29, 1996.

(51) Int. Cl.[7] .................................................. H04N 9/475
(52) U.S. Cl. .......................... 348/515; 348/512; 348/578
(58) Field of Search ..................................... 348/515, 512, 348/518, 571, 576, 578, 632, 633, 722, 423, 462, 480–485; 345/302; 704/270; 386/52, 54, 75; H04N 9/475

(56) References Cited

U.S. PATENT DOCUMENTS

| | | | |
|---|---|---|---|
| 4,605,964 | * 8/1986 | Chard | 348/515 |
| 4,692,803 | 9/1987 | Tobita | 358/143 |
| 5,202,761 | 4/1993 | Cooper | 358/149 |
| 5,264,933 | 11/1993 | Rosser et al. | 358/183 |
| 5,353,392 | 10/1994 | Luquet et al. | 395/135 |
| 5,387,943 | 2/1995 | Silver | 348/512 |
| 5,430,495 | 7/1995 | Ko | 348/589 |
| 5,436,672 | 7/1995 | Medioni et al. | 348/591 |
| 5,467,139 | 11/1995 | Lankford | 348/512 |
| 5,488,675 | 1/1996 | Hanna | 382/284 |
| 5,491,517 | 2/1996 | Kreitman et al. | 348/581 |
| 5,880,788 | * 3/1999 | Bregler | 348/515 |

FOREIGN PATENT DOCUMENTS

| | | |
|---|---|---|
| PCT/US94/01679 | 2/1994 | (WO). |
| PCT/US94/11527 | 10/1994 | (WO). |

* cited by examiner

Primary Examiner—Michael Lee
(74) Attorney, Agent, or Firm—Woodbridge & Associates, P.C.; Richard C. Woodbridge

(57) ABSTRACT

A system and method (40) of altering the audio portion of a live television broadcast signal substantially in real time. The system is used to enhance the effects of live video insertion systems. The broadcast signal is received and separated into a pattern recognition unit (72) in order to recognize predetermined events. The broadcast audio is then altered based on the occurrence of said events. Alterations (68, 70) include modifications to attributes such as volume, tone, pitch, synchronization, echo, reverberation, and frequency profile. Once altered, the audio is re-synchronized (80) with the video channel which has undergone its own modification.

26 Claims, 3 Drawing Sheets

AUDIO ENHANCED ELECTRONIC INSERTION OF INDICIA INTO VIDEO

CROSS-REFERENCE TO RELATED APPLICATIONS

This patent application claims the priority and benefit of U.S. Provisional Patent Application No. 60/016,419 filed on Apr. 29, 1996 entitled "Audio Enhanced Electronic Insertion of Indicia into Video".

BACKGROUND OF THE INVENTION

1. Field of the Invention

This invention relates to the improved performance of devices for inserting realistic indicia into video sequences, and particularly, to the enhancement by the addition of audio effects related to the insertions.

2. Description of the Related Art

Electronic devices for inserting electronic images into live video signals, such as described in U.S. Pat. No. 5,264,933 to Rosser, et al. and U.S. Pat. No. 5,491,517 to Kreitman et al., have been developed and used commercially for the purpose of inserting advertising and other indicia into video sequences, including live broadcasts of sporting events. To varying degrees of success, these devices seamlessly and realistically incorporate indicia into the original video in real time. Realism is maintained even as the original scene is zoomed, panned, or otherwise altered in size or perspective.

U.S. Pat. No. 5,264,933 to Rosser, et al. discusses having the video insert respond to sound in the event, i.e. having the video insert pulse or change color in response to a rise in crowd noise. It does not, however, disclose the reverse possibility of adding a sound effect to the audio to coincide with a video insert, i.e. adding a beat to the program sound to coincide with the pulsing of the insertion, or altering the program audio in response to audio or visual cues in the program or in response to some operator command.

Other patents concerning video insertion technology, such as U.S. Pat. No. 5,491,517 to Kreitman et al., U.S. Pat. No. 5,353,392 to Luquet et al., or U.S. Pat. No. 5,488,675 to Hanna or PCT applications PCT/US94/01679 and PCT/US94/11527 of Sharir and Tamir confine themselves strictly to the video portion of a broadcast. None of the aforementioned patents or applications disclose methods for making an inserted indicia look more realistic by adding synchronized audio effects.

SUMMARY OF THE INVENTION

The invention comprises both a method and an apparatus to enhance real time insertion of indicia into video by altering the audio portion of a broadcast as well as the video portion of the broadcast. The invention applies equally well to real time insertion of video indicia accomplished by means of pattern recognition technology; by means of camera motion sensors attached to the cameras recording the event; or by a combination of pattern recognition and camera motion sensors.

In the present invention each still or animated video sequence intended for insertion into the live video has an associated audio sequence. When the still image, animated image sequence, or video sequence is inserted, the associated sound sequence is also activated. Sound activation may be triggered by the start of the insertion; some action in the video portion of the insertion; some action either in the video or audio channel of the broadcast; by some combination of action in the audio and video channel, or partially or wholly, by an operator. In addition to triggering, the playing, volume, modulation, termination, or any other attribute of the associated sound sequence, may be influenced by the inserted image, animation or video, audio or video channel of the event, some combination of the audio and video channel of the event or partly or wholly by an operator.

The associated audio sequence is stored either digitally in system memory in the same manner as the video sequences are stored, or separately on either an analogue or digital medium.

A live video insertion system is enhanced so that, in addition to channels for program video and video insertion, an enhanced audio processor is added within an audio channel. In a standard live video insertion system the audio channel is merely a delay line allowing the program audio to be delayed during video processing. The enhanced audio processor interacts with the pattern recognition and tracking part of the live video insertion system (LVIS™). If the audio mixing is done digitally, there is also means to convert the program audio from analogue to digital and back to analogue after the mixing is done.

The enhanced audio processor also includes means for audio pattern recognition for adding an audio sequence to the broadcast audio, or otherwise alter the broadcast audio. Audio pattern recognition can be used alone or in conjunction with commands from the video pattern recognition and tracking module of the LVIS™. It can also be used in conjunction with operator commands.

Making an inserted indicia appear as if it is actually part of the original video scene is an important aspect of the technology. Appropriate audio cues can considerably enhance the visual illusion that the inserted video indicia is part of the original scene. Audio enhancement of the illusion is particularly effective if the inserted indicia is an animated sequence and the added audio is timed to coincide with specific actions of the animation. For example, an inserted video indicia can be programmed to pulse on and off. To enhance this illusion, a sound effect can increase or decrease in volume in sync with the pulsing video insertion. Other examples include changes in pitch, tone, reverberation, added echo, spoken dialogue, or musical jingles of an audio insert that are synchronized with changes in the inserted video.

Alteration of the original program sound rather than addition of a separate audio insert can be done as well. For instance, crowd noise could be artificially modulated to coincide with a change in the inserted logo. Consider an animated version of a team mascot. As the artificially inserted team mascot raises and lowers its arms, the crowd volume could increase or decrease accordingly adding to the illusion that the mascot was actually in the stadium.

Further enhancements include synchronizing an audio addition or the actual broadcast audio with an audio or visual cue occurring in the action of the event being broadcast. In a baseball game, for instance, a cartoon character insertion can react to an audio event such as the crack of the bat with a suitable phrase in the distinctive voice of the character. Or, the reaction could be synchronized to a visual cue such as swinging the bat. A combination of visual and audio cues may be partially or entirely operator activated and synchronized to an event like the start or end of an inning. Additionally, if the insert in a baseball game appeared to be hit by the ball, a suitable sound appearing to come from the injured insert could be added to the program audio. Utilizing known speech recognition techniques, the audio cue could be a command, a well known phrase, or team name.

Added sound can follow the movement of a video insert. For instance, the volume associated with the insert could increase as the camera zooms in and the insertion grows in size. For stereo broadcasts, the ratio of the left and right channels can be altered as the insert panned off to the side such that the sound seems to follow the insert.

DETAILED DESCRIPTION OF THE PREFERRED EMBODIMENT

During the course of this description like numbers will be used to identify like elements according to the different figures which illustrate the invention.

A typical live video insertion system (LVIS™) is described in detail in several related applications: U.S. Provisional Patent Application No. 60/000,279 filed on Jun. 16, 1995 entitled "APPARATUS AND METHOD OF INSERTING IMAGES INTO TELEVISION DISPLAYS"; U.S. patent application filed Nov. 28, 1995 entitled "SYSTEM AND METHOD FOR INSERTING STATIC AND DYNAMIC IMAGES INTO A LIVE VIDEO BROADCAST"; U.S. patent application No. 08/381,088 filed Jan. 31, 1995 entitled "LIVE VIDEO INSERTION SYSTEM"; and U.S. patent application No. 08/580,892 filed Dec. 12, 1995 entitled "METHOD OF TRACKING SCENE MOTION FOR LIVE VIDEO INSERTION SYSTEMS", the teachings of which are hereby included by reference.

Figure 1:
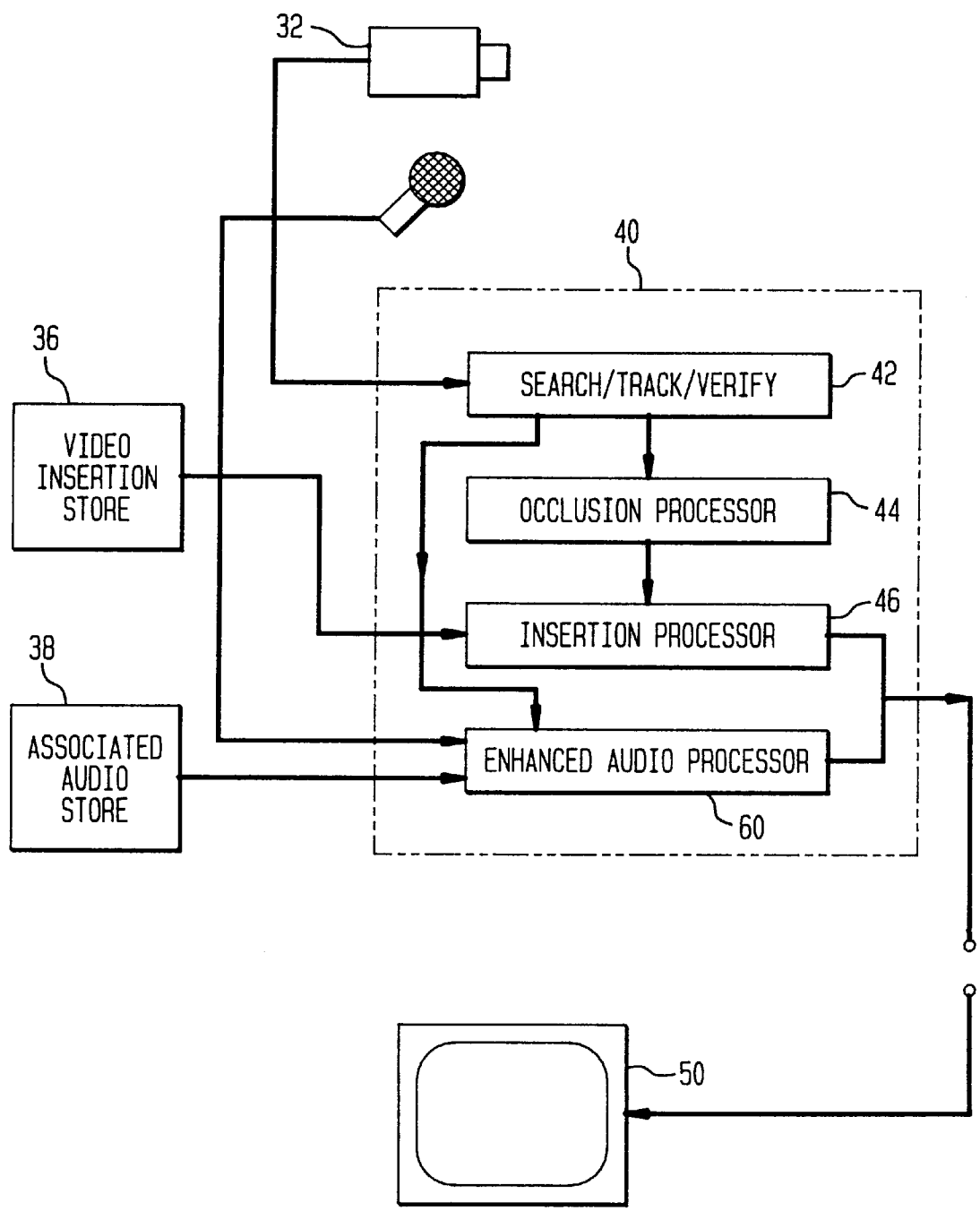
FIG. 1 illustrates a schematic plan of a live video insertion system modified to include an enhanced audio processor.

In a typical LVIS™ 40, as shown schematically in FIG. 1, a video signal from a camera 32 recording an event is brought into a Search/Tracking/Verification module 42. The Search/Tracking/Verification module 42 is equivalent to the camera parameter extraction module in pending PCT applications PCT/US94/01679 and PCT/US94/11527 of Sharir and Tamir. Search/Tracking/Verification module 42 uses pattern recognition, information from sensors attached to the camera, the tally signal from a broadcast switcher, or some combination of these three sources of information, to determine which camera is viewing the scene. Module 42 then calculates the orientation and field of view of the camera expressing them as model warp parameters 20 (FIG. 2) relating the current camera view to a reference view. The warp parameters 20 are derived from pattern recognition and are expressed as an affine transformation with respect to a reference view from that camera. However, the warp parameters may be any suitable mathematical transform, including, but not restricted to, models such as a full perspective transform.

Figure 2:
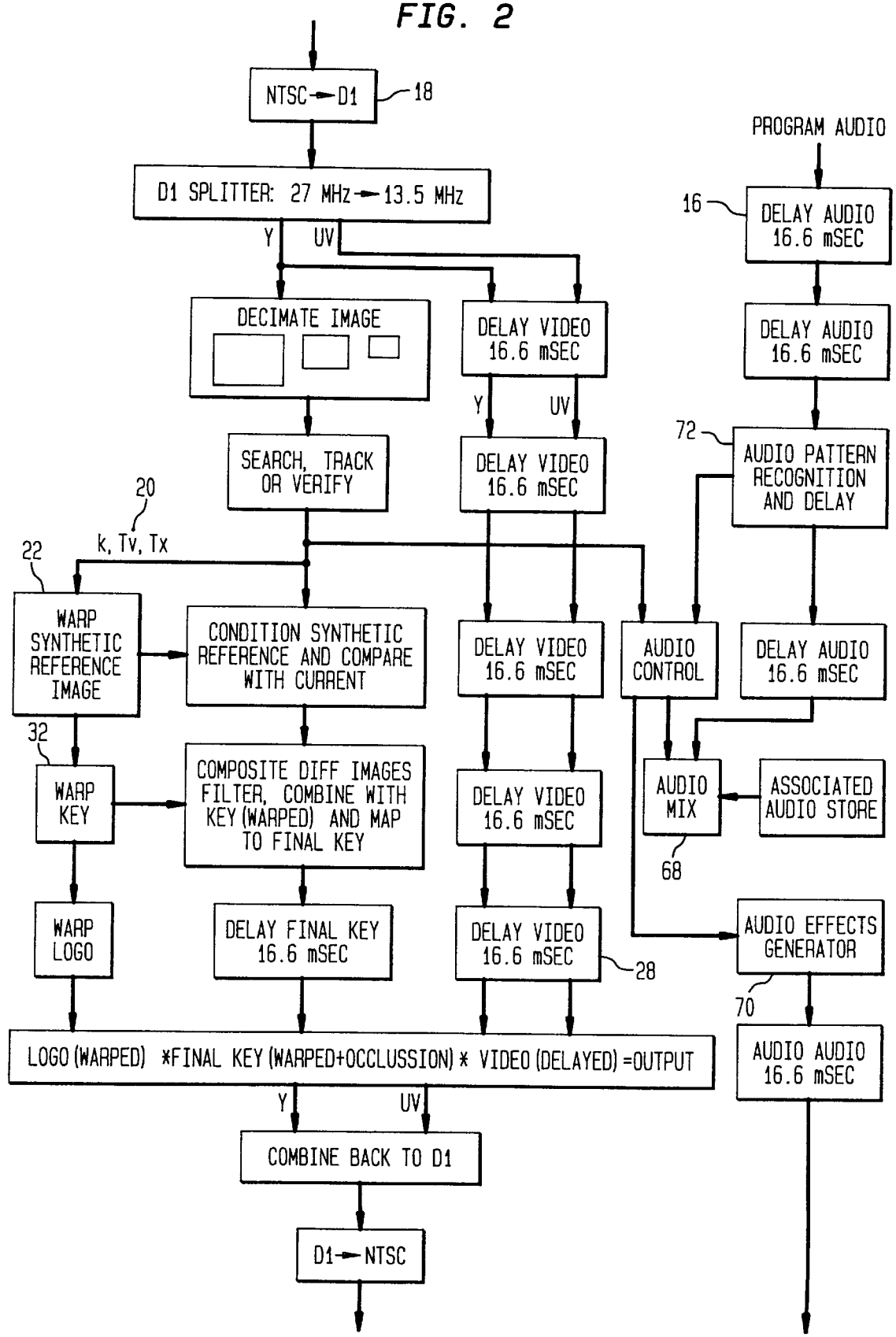
FIG. 2 is a flow diagram showing the flow of data through the system as each field of video is processed.

Referring to FIG. 2, the warp parameters 20 are used in conjunction with a synthetic reference image 22 in occlusion processor 44 to generate a key 32 which indicates which part of the live video 28 where a logo 26 is going to be inserted has objects the logo 26 should not obscure.

A major enhancement over conventional blue screen occlusion processing technology is that the occlusion of the present system can be performed on textured surfaces. Insertion processor 46 (FIG. 1) takes key 32 and a logo image 26 and places logo image 26 into the live video 28 so that logo image 26 looks as if it is part of the original scene.

Logo image 26 may be another source of video, including an animated clip from a video storage device 36. The video storage device 36 is a digital tape recorder or a digital video disk or other suitable storage medium. Video storage device 36 is controlled by information from the search/track/verify module 42 or by a system operator so that the appropriate animation is selected and set in motion at the appropriate time to match action in the live video broadcast. For instance, in a baseball game an animation sequence could be a sponsors logo morphing into a team mascot just after the batter has attempted to hit the ball. Different animation sequences can be selected by an operator depending on whether the swing attempt was successful or if the pitch was a strike or a ball.

In the present invention, a typical live video insertion system (LVIS™) 40 is modified by the addition of an enhanced audio processor 60, as shown schematically in FIG. 1. Enhanced audio processor 60 is a micro-processor that interprets and responds to input from image recognition and tracking module 42 of LVIS™ system 40. An audio coordinator 62 (FIG. 3) is programmed for interpreting and responding to input from video pattern recognition unit 64 which is part of the Search/Track/Verify unit 42.

Enhanced audio processor unit 60 further responds to direct operator control as the audio coordinator 62 also interprets and responds to operator input unit 66 which forms a part of the user interface.

Additionally, enhanced audio processor 60 synchronously adds or mixes an associated audio insert with the broadcast audio utilizing any of the control signals. This includes signals from its own pattern recognition module since audio coordinator 62 and audio mixer unit 68 are programmable microprocessors. Audio mixer unit 66 may be a commercial unit such as the WhirlWind Inc., of Rochester, N.Y. "MIX-44", which is a fully programmable, computer controllable audio mixing machine.

Enhanced audio processor 60 can also modify the broadcast audio volume, tone, pitch and can create echoes, reverberations and other similar audio effects. Audio effects unit 70 can be an off the shelf commercial unit such as the Applied Research Technology Inc., of Rochester, N.Y. "Effects Network", which is a fully programmable, computer controllable audio multi-effects machine.

Enhanced audio processor unit 60 also has means for audio pattern recognition of sounds in the broadcast audio including voice recognition. Audio pattern recognition unit 72 is a programmable micro-processor using one or more of the well known audio pattern recognition algorithms discussed, for instance, in U.S. Pat. No. 4,802,231 to Davis, or U.S. Pat. No. 4,713,778 to Baker.

In alternative embodiments, simplified versions of the enhanced audio processor 60 may have any subset of these key characteristics.

An innovation of the present invention includes the addition of an audio storage device 38 which stores sound effects related to the video insert animations stored in video storage unit 36. Enhanced audio processor 60 is no longer just a delay pipeline as in standard LVIS™ systems. The heart of enhanced audio processor 60 is audio coordinator unit 62. Audio coordinator unit 62 uses tracking or other computer generated information, operator input, program generated parameters, or some combination thereof, to mix an audio clip from audio storage device 38 with broadcast audio 16. Enhanced audio processor 60 is able to affect all necessary attributes of both the broadcast audio relayed through the system and an associated audio clip mixed into the broadcast audio by means of audio effects unit 70. Said attributes include, but are not limited to, volume, tone, echo, distortion, fade, reverberation, and frequency profile. In addition, audio coordinator 62 is able to affect the start, end, play speed, synchronization, and other such attributes of the associated audio clip. All audio manipulations are a synchronized function of input from the computer, from other suitable external clocks or triggers, from an operator, or from any combination thereof.

Enhanced audio processor 60 also incorporates an audio pattern recognition unit 72 which has signal processing capabilities like those disclosed in U.S. Pat. No. 4,802,231 to Davis, or U.S. Pat. No. 4,713,778 to Baker. Enhanced audio processor 60 can recognize simple speech and other distinct audio signals, monitor their levels and other attributes, and use their characteristics to control or modify the associated audio clip mixed into the broadcast audio. Said attributes include, but are not limited to, start, end, play speed, synchronization, volume, tone, pitch, echo, reverberation and frequency profile. Audio coordinator 62 can also use recognized audio patterns to modify certain characteristics of the broadcast audio such as volume, tone, pitch, echo, reverberation and frequency profile.

In the preferred embodiment of the present invention, Search/Track/Verify module 42 is enhanced so that in addition to being able to recognize and track objects, landmarks, and texture for the purpose of seamlessly inserting indicia in the overall scene, it uses the same techniques to recognize and/or track the motion of events occurring within the scene. Such events include, but are not limited to, the swinging of a baseball bat or the trajectory of a tennis ball. The search/track/verify module 42 feeds this information to audio coordinator 62 for the purpose of controlling or modifying either or both of the associated audio and broadcast audio in the manner discussed above.

Audio coordinator 62 can also adjust the audio associated with the insertions and the broadcast audio via direct operator commands. This is accomplished by operator unit 66 which is part of the LVIS™ user interface. Audio coordinator 62 can also act in response to a combination of commands from the operator, the visual image recognition and tracking sections, and the audio signal recognition and monitoring sections, and use those combinations, which may include one or more dependent occurrences over time, to modify, synchronize or otherwise adjust attributes of both the associated audio and the broadcast audio. The modifications include, but are not limited to, changes in volume, tone, pitch, synchronization, echo, reverberation, and frequency profile of the broadcast audio, and start, end, play speed, volume, tone pitch, synchronization, echo, reverberation, and frequency profile of the associated insert audio.

Figure 3:
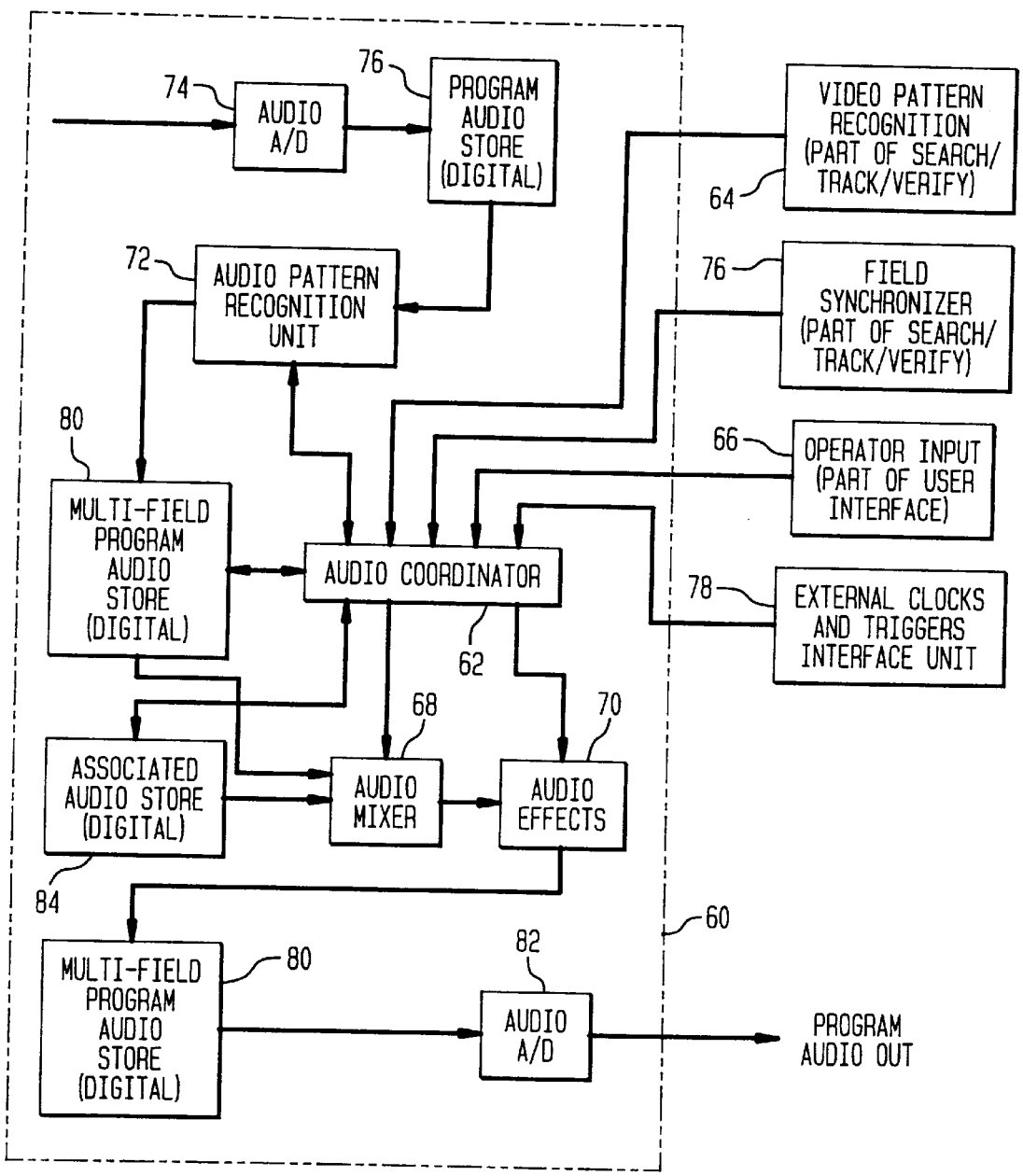
FIG. 3 illustrates a more detailed schematic drawing of the enhanced audio processor.

A schematic representation of the preferred embodiment of the enhanced audio processor 60 is illustrated in FIG. 3. The broadcast audio is first digitized using an audio analogue to digital convertor 74. The digitized program audio is stored in program audio store 76 which corresponds to audio delay units 16 in the conventional LVIS™ audio path (FIG. 2). The audio signals then pass through audio pattern recognition unit 72, which, under control of audio coordinator 62, is capable of recognizing audio patterns, including speech. Recognition of patterns or speech by audio pattern recognition unit 72 is used by audio coordinator 62 to control the type and timing of adjustments to the broadcast audio and the associated audio by means of audio mixer 68 and audio effects unit 70.

Audio coordinator 62 also receives information from video pattern recognition unit 64, field synchronizer 76, operator input 66, and from the external clocks and triggers interface unit 78 for controlling the type and timing of adjustments to the broadcast audio and the associated insert audio by means of audio mixer 68 and audio effects unit 70. The audio sequence to be added to the program audio is stored in the associated audio store 84 which is also under control of audio coordinator 62. Audio coordinator 62 determines what is transferred to audio-mixer 68 and when said transfer occurs. The resultant mixed program audio passes through audio effects unit 70 where further adjustments to attributes like volume, tone, pitch, echo, reverberation and frequency profile are made under the control of audio coordinator 62.

The resultant audio is then stored in a multi-field program audio store 80 for the appropriate amount of time (a few video fields) to synchronize it with the video image before being converted back to analogue form using an audio digital to analogue convertor 82. The analogue audio output is then incorporated into the video signal to form a standard broadcast signal such as NTSC or PAL and broadcast.

Although the preferred embodiment described has the audio mixed in the digital domain, the entire audio operation could be done in the analogue domain using appropriate equipment well known in the art.

The preferred embodiment as shown in FIG. 2 describes audio mixer 68 as being used in the fifth field of the overall LVIS™ cycle and audio effects generator 70 used in the sixth field. Both audio mixer 68 and audio effects generator 70, however, could be used anywhere in the processing cycle as long as appropriate offsets were used between the video field stored in video insertion store 36 and the audio field stored in associated audio store 38. In particular, both audio mixer 68 and audio effects generator 70 can be used in the last field of processing, coincident with the combination of the logo, final key and video to form video output 30. This would have the advantage of only requiring a single multi-field program audio store 80 as opposed to the layout of the enhanced audio processor 60 shown in FIG. 3 which requires two such devices.

It is to be understood that the apparatus and method of operation taught herein are illustrative of the invention. Modifications may readily be devised by those skilled in the art without departing from the spirit or scope of the invention.

What is claimed is:

1. A method of altering the audio portion of a live television broadcast signal substantially in real time, said method comprising the steps of:

(a) receiving 18 said live television broadcast signal;

(b) separating the video and audio portions of said live television broadcast signal into separate channels;

(c) delaying 28 the video portion of said live television broadcast signal;

(d) recognizing 72 an event within the audio or video portion of said live television broadcast signal;

(e) altering 68 70 the audio portion of said live television broadcast signal based upon said event;

(f) re-synchronizing 80 the audio and video portions of said live television broadcast signal; and (g) outputting 50 the audio altered live television broadcast signal.

2. The method of claim 1 wherein said altering 68 step (e) optionally includes mixing 68 a second audio channel containing a predetermined audio clip 84 into said live television broadcast audio channel.

3. The method of claim 2 wherein said audio channels include audio attributes such as volume, tone, pitch, synchronization, echo, reverberation, and frequency profile.

4. The method of claim 3 wherein said altering 70 step (e) modifies at least one of said audio attributes.

5. The method of claim 4 wherein said recognizing 72 step (d) is based on audio pattern recognition of said event.

6. The method of claim 4 wherein said recognizing step (d) is based on video pattern recognition 64 of said event.

7. The method of claim 4 wherein said recognizing step (d) is based on direct operator input 66.

8. A method of altering the audio portion of a live television broadcast signal substantially in real time, said method comprising the steps of:
   (a) receiving 18 said live television broadcast signal;
   (b) converting 74 said live television broadcast signal from the analog domain to the digital domain;
   (c) separating the video and audio portions of said live television broadcast signal into separate channels;
   (d) delaying 28 the video portion of said live television broadcast signal;
   (e) recognizing an event within the audio 72 or video 64 portion of said live television broadcast signal;
   (f) altering 68 70 the audio portion of said live television broadcast signal based upon said event;
   (g) re-synchronizing 80 the audio and video portions of said live television broadcast signal;
   (h) re-converting 82 said live television broadcast signal back to the analog domain; and
   (i) outputting 50 the audio altered live television broadcast signal.

9. The method of claim 8 wherein said altering step (f) optionally includes mixing 68 a second audio channel containing a predetermined audio clip 84 into said live television broadcast audio channel.

10. The method of claim 9 wherein said audio channels include audio attributes 70 such as volume, tone, pitch, synchronization, echo, reverberation, and frequency profile.

11. The method of claim 10 wherein said altering 70 step (f) modifies at least one of said audio attributes.

12. The method of claim 11 wherein said recognizing step (e) is based on audio pattern recognition 72 of said event.

13. The method of claim 11 wherein said recognizing step (e) is based on video pattern recognition 64 of said event.

14. The method of claim 11 wherein said recognizing step (e) is based on direct operator input 66.

15. A method of altering the audio and video portion of a live television broadcast signal substantially in real time, said method comprising the steps of:
   (a) receiving 18 said live television broadcast signal;
   (b) converting 74 said live television broadcast signal from the analog domain to the digital domain;
   (c) separating the video and audio portions of said live television broadcast signal into separate channels;
   (d) delaying 28 the video portion of said live television broadcast signal;
   (e) recognizing at least one event within the audio 72 or video 64 portion of said live television broadcast signal;
   (f) altering 68 70 the audio portion of said live television broadcast signal based upon said at least one event;
   (g) altering the video portion of said live television broadcast signal based upon the same or a different one of said at least one event;
   (h) re-synchronizing 80 the audio and video portions of said live television broadcast signal;
   (i) re-converting 82 said live television broadcast signal back to the analog domain; and
   (j) outputting 50 the audio altered live television broadcast signal.

16. The method of claim 15 wherein said altering step (f) optionally includes mixing 68 a second audio channel containing a predetermined audio clip 84 into aid live television broadcast audio channel.

17. The method of claim 16 wherein said audio channels include audio attributes such as volume, tone, pitch, synchronization, echo, reverberation, and frequency profile.

18. The method of claim 17 wherein said altering 70 step (f) modifies at least one of said audio attributes.

19. The method of claim 18 wherein said recognizing step (e) is based on audio pattern recognition 72 of said event.

20. The method of claim 18 wherein said recognizing step (e) is based on video pattern recognition 64 of said event.

21. The method of claim 18 wherein said recognizing step (e) is based on direct operator input 66.

22. A system for altering the audio portion of a live television broadcast signal substantially in real time comprising:
   separation means for separating the audio and video portions of said live television broadcast signal into separate channels which are independently manipulatable;
   audio pattern recognition means 72 for recognizing an event within the audio portion of said live television broadcast signal;
   audio processor means 60 for receiving said audio portion of said live television broadcast signal and altering same based upon said event; and,
   re-synchronization means for re-synchronizing the audio and video portions of said live television broadcast signal after said live television broadcast signal audio portion has been altered.

23. The system of claim 22 wherein said audio processor means 60 further comprises:
   first audio storage means 80 for storing and delaying said live television broadcast signal audio portion;
   second audio storage means 84 for storing an insertable audio clip;
   audio coordinator means 62 for receiving information regarding said event and controlling the type and timing of the altering of said live television broadcast signal audio portion;
   audio mixer means 68 for selectively mixing, as controlled by said audio coordinator means, said insertable audio clip and said live television broadcast signal audio portion; and
   audio effects means 70 for selectively modifying attributes of said live television broadcast signal audio portion and said mixed live television broadcast signal audio portion, as controlled by said audio coordinator means.

24. The system of claim 23 wherein said event information further includes signals received into said audio coordinator means 62 from sources outside of said audio processor means 60.

25. The system of claim 24 wherein said outside sources comprise operator input means 66, video pattern recognition means 64, field synchronization means 76, external trigger means 78, external clock means 78, or any combination thereof.

26. The system of claim 25 wherein said attributes include volume, tone, pitch, synchronization, echo, reverberation, and frequency profile.

* * * * *